(12) United States Patent
Takano et al.

(10) Patent No.: US 11,340,404 B2
(45) Date of Patent: May 24, 2022

(54) FIBER ARRAY ASSEMBLY USING A FIXING MATERIAL FOR SECURING FIBER OPTIC BUNDLES THEREIN

(71) Applicant: Senko Advanced Components, Inc., Marlborough, MA (US)

(72) Inventors: Kazuyoshi Takano, Tokyo (JP); Gang Xu, Kowloon (HK); Tomoyuki Mamiya, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 17/065,251

(22) Filed: Oct. 7, 2020

(65) Prior Publication Data
US 2021/0109292 A1     Apr. 15, 2021

Related U.S. Application Data

(60) Provisional application No. 62/913,719, filed on Oct. 10, 2019.

(51) Int. Cl.
*G02B 6/36* (2006.01)
*G02B 6/04* (2006.01)

(52) U.S. Cl.
CPC ............. *G02B 6/3636* (2013.01); *G02B 6/04* (2013.01); *G02B 6/3696* (2013.01)

(58) Field of Classification Search
CPC ...... G02B 6/3636; G02B 6/3696; G02B 6/04; G02B 6/403
See application file for complete search history.

(56) References Cited

U.S. PATENT DOCUMENTS 9,766,411 B2 *    9/2017   Butler ................. G02B 6/4249
2010/0232743 A1 * 9/2010   Ishikawa ............. G02B 6/3636
                                                                385/14

\* cited by examiner

*Primary Examiner* — John Bedtelyon (57) ABSTRACT

A fiber array device configured to secure and align one or more optical fiber bundles as part of a main body using a fixing material. The fixing material is light cured or room temperature cured. Main body forms an angle from a first direction along a second direction, and a recess the optical bundles are laid within and in which the fixing material is applied. Each individual optical fiber is laid within a groove formed in a lid, the base portion or both the lid and the base portion. The fiber array device is secured to a printed circuit board to form a communication path between the optical fiber and electronics of the board.

23 Claims, 8 Drawing Sheets

FIBER ARRAY ASSEMBLY USING A FIXING MATERIAL FOR SECURING FIBER OPTIC BUNDLES THEREIN

CROSS REFERENCE TO RELATED APPLICATIONS

This application claims priority to U.S. Provisional Patent application No. 62/913,719 filed Oct. 10, 2019 titled "One Piece Fiber Array Using an Epoxy Filler", which is fully incorporated by reference.

FIELD OF THE INVENTION

The present disclosure relates generally to fiber array to bend a plurality of optical fibers between 60 degrees and 120 degrees using a curable filler.

BACKGROUND

The prevalence of the Internet has led to unprecedented growth in communication networks. Consumer demand for service and increased competition has caused network providers to continuously find ways to improve quality of service while reducing cost.

Solutions deployed in the field require fiber arrays to bend multiple optical fibers in the 900 nanometer range all at the same angle so the optical fibers are interconnected to an silicon wafer or a print circuit board.

Optical fiber is typically glass. The glass has an outer jacket, inner strength or reinforcing fibers and a covering. These components are stripped and pulled back. The glass fiber is cleaved, inserted into a ferrule assembly and polished. The glass fiber is polished at a proximal end of the connector. The optical fibers are laid within V-grooves, grooves, channels or concave openings to ensure the fibers are spaced apart at equal distances, and to further ensure repeatability in terminating the optical fibers to a wafer or printed circuit board. Alternatively, an optical fiber may be 100% polymer or plastic.

However, these prior art devices depend on a V-groove of averaged size to accept various optical fiber sizes. A smaller optical fiber than the V-groove dimension would allow the opposing fibers to become offset increasing signal loss between the endfaces of the opposing optical fibers.

The prior art devices rely on mechanical fitting of multiple components that have manufacturing tolerances. The cost to ensure a tight fit is offset using a fillable material that cures to a solid state about the fibers and further secures the remaining mechanical components together. The loose fit of the components results in movement and the fibers become misaligned over time due to expansion in the environment. Debris and moisture can ingress between the components leading to further loss in alignment. Also, assembly is more complicated with a large number of components. The parts are small and difficult to assemble into a final fiber array.

Figure 1:
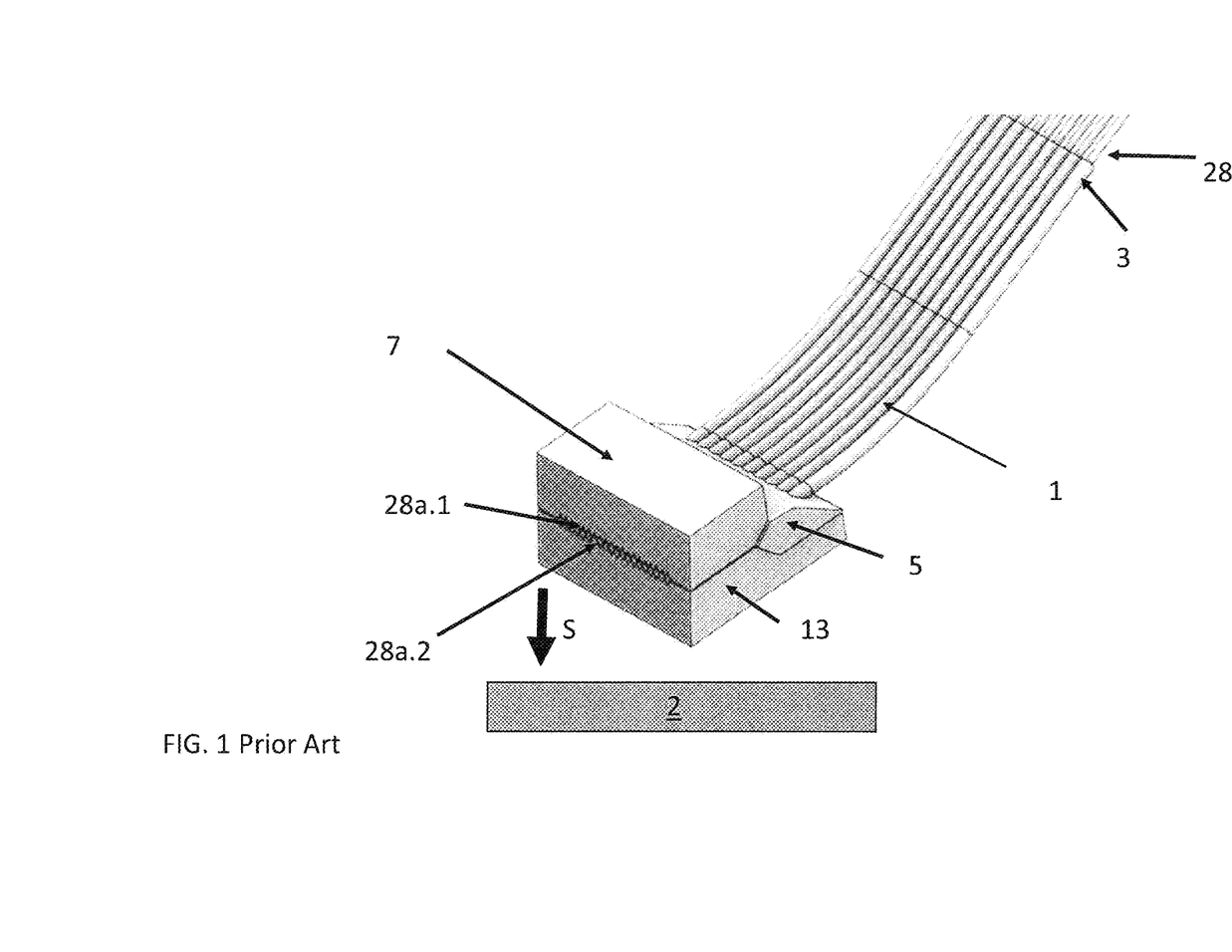
FIG. 1 is a perspective view of a prior art mechanical fit fiber array.

A prior art device is depicted in FIG. 1. Multiple optic fibers 28 are secured within a sleeve 3, typically made of plastic, which moves due to heat expansion. The array of bundled fibers are put through a guide 5, which complicates assembly due to the small size of the optical fiber at 900 nm or less, and the optical fibers themselves are suspect to micro-cracks when assembled resulting light loss or data loss. The guide 5 needs to be secured to the base 13, which increases assembly complexity. The individual fibers are laid in opposing grooves (28a.1, 28a.2) that increases assembly complexity. Lid 7 needs to be secured by mechanical latch or friction fit which overtime and use the lid may become loose, leading to optical data loss due to misalignment. In this device, the sheath performs the bend radius 1 which has a lot of movement as the sheath itself is flexible. The final assembly is secured to a printed circuit board or silicon wafer 2, in the direction of arrow S.

Figure 2:
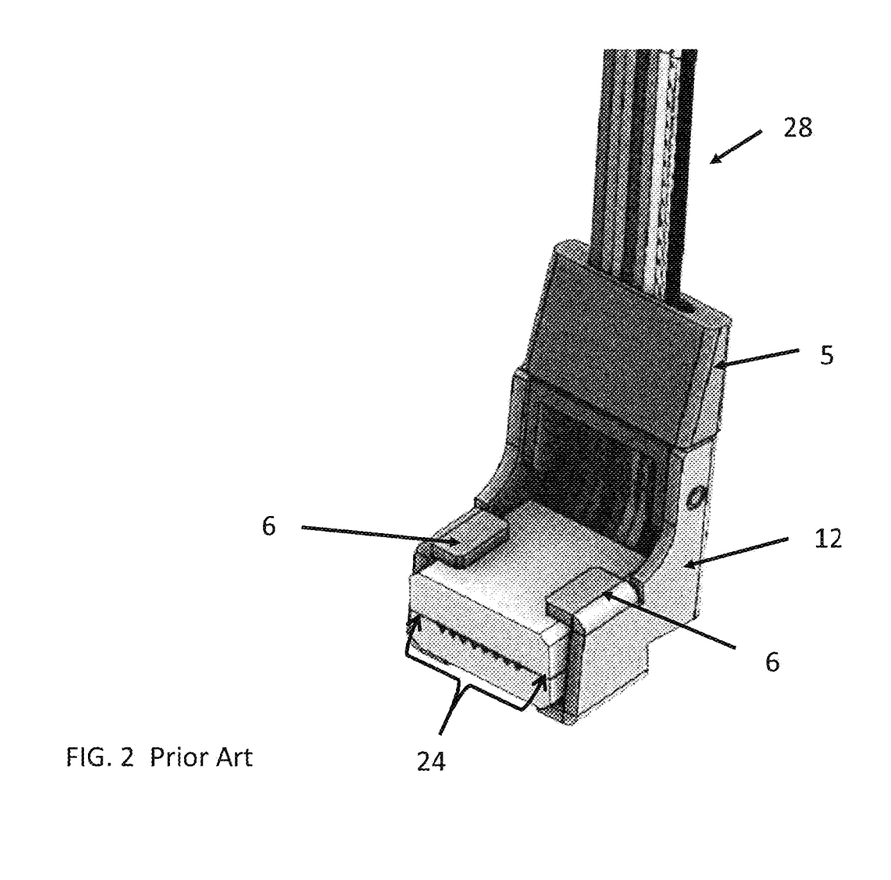
FIG. 2 is a perspective view of a second prior art mechanical fit fiber array.

FIG. 2 depicts another prior art device with multiple components. Optical fiber bundle 28 is inserted through an opening of guide 5. As illustrated the fiber bundle can move laterally within the opening leading to stress on the optical fibers. The fiber bundle can become misaligned. As illustrated, the fiber bundle is laid within the angled main body 12 and is not secured therein. Upper and lower lids are secured by opposing clips 6 to mechanically secure the fiber bundle, and without zero manufacturing fit tolerances, the optical fiber bundle is susceptible to movement along the grooves. Further, with opposing grooves alignment between the opposing lids may pinch one or more optical fibers. The assembler would not see the issue as the two lids are blind mated.

Figure 3:
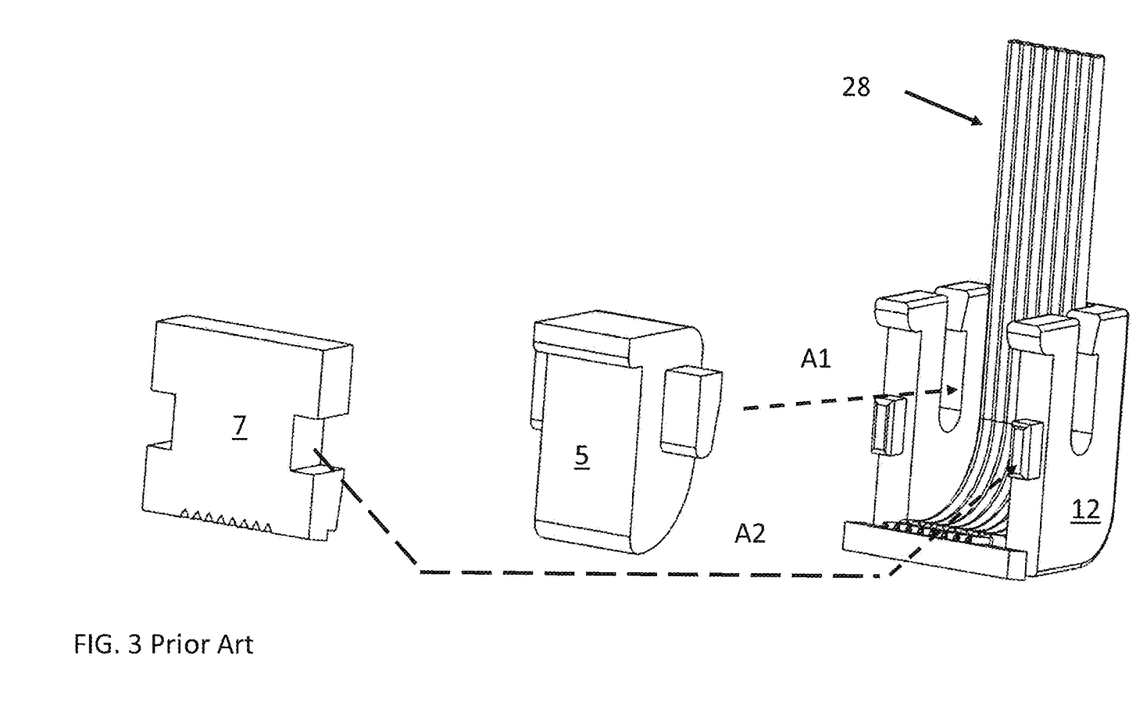
FIG. 3 is a perspective view of a third prior art mechanical fit fiber array.

FIG. 3 depicts an exploded view of a third prior art primarily mechanical fitting fiber array. The sheathed fiber bundler 28 is within base 12, and guide 5 is constructed to mechanically lock tabs within channels of the base 12 as shown arrow A1. Lid 7 is secure along arrow A3, and again the lower grooves with optical fibers therein is blind mated to the upper grooves in lid 7. Blind mating can result in optical fiber damaged and data loss.

There is a need to improve alignment, assembly and environmental durability, and to bend the optical fiber bundle between 60 degrees to 120 degrees without using multiple hardware components. There is a further need to prevent movement of the optical fibers once secured in a prior art fiber array.

SUMMARY OF THE INVENTION

The present invention reduces time to build a fiber array. The fiber array has a main body formed of a single piece of material, and the base forms a recess that accepts one or more bundles of optical fibers, called ribbon cables. The bundles or group of optical fibers are laid within the base, and each optical fiber is mated with a V-groove formed in the based, or formed in a lid. Once the optical fibers are laid within the recess, and the lid is secured a filler that can be cured is added to cover the optical fibers. Once the filler is cured or sets, the optical fibers are fixed from movement within the grooves thus retaining alignment with the grooves. And the bend is maintained along a curved section of the base forming the recess in which the fillable or fixing material is applied.

BRIEF DESCRIPTION OF THE DRAWINGS

Corresponding reference characters indicate corresponding parts throughout the drawings.

DETAILED DESCRIPTION

The following terms shall have, for the purposes of this application, the respective meanings set forth below.

A connector is a device the completes a communication path from an optical fiber strand that transmits a light signal to another connector or to transceiver electronics. The electronics convert the light signal into a digital signal. A connector is inserted and secured at either end of adapter, for example, a ferrule connector (FC), a fiber distributed data interface (FDDI) connector, an LC connector, a mechanical transfer (MT) connector, a standard connector (SC) connector, an SC duplex connector, or a straight tip (ST) connector. The connector may be defined by a connector housing body, an external latch or recess to secure said connector into adapter opening and one or more ferrules having optic fibers therein. In some embodiments, the housing body may incorporate any or all of the components described herein.

A receptacle is an adapter with internal structure to secure a proximal end or ferrule end of a connector within a port or opening. An adapter allows a first and second connector to interconnect or oppose each other to transmit a light signal from one part of a cable assembly to another, as an example. A receptacle may be a transceiver with an opening to receive a connector.

A "fiber optic cable" or an "optical cable" refers to a cable containing one or more optical fibers for conducting optical signals in beams of light. The optical fibers can be constructed from any suitable transparent material, including glass, fiberglass, polymer optical fiber, or plastic. The cable can include a jacket or sheathing material surrounding the optical fibers. Between the outer sheath and the optical fiber are strands of strength members or tensile members. In addition, the cable can be connected to a connector on one end or on both ends of the cable.

FIG. 1 through FIG. 3 are prior art mechanical fit arrays described in the background the present invention.

Figures 4A, 4B:
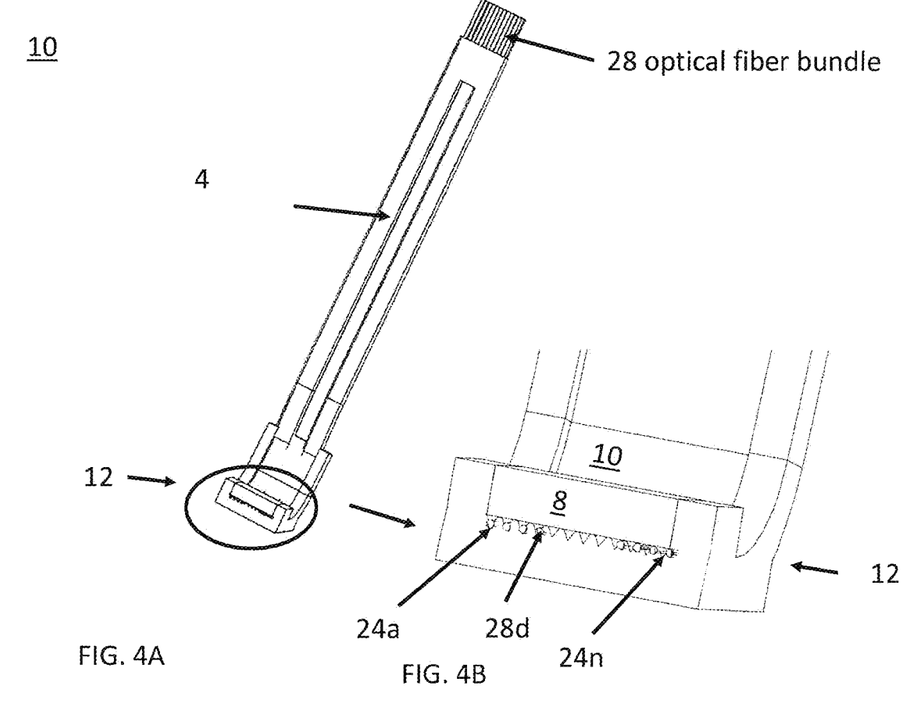
FIG. 4A is an assembled view of fiver array according to the present invention.
FIG. 4B is a zoomed view of FIG. 4A.
Figure 4C:
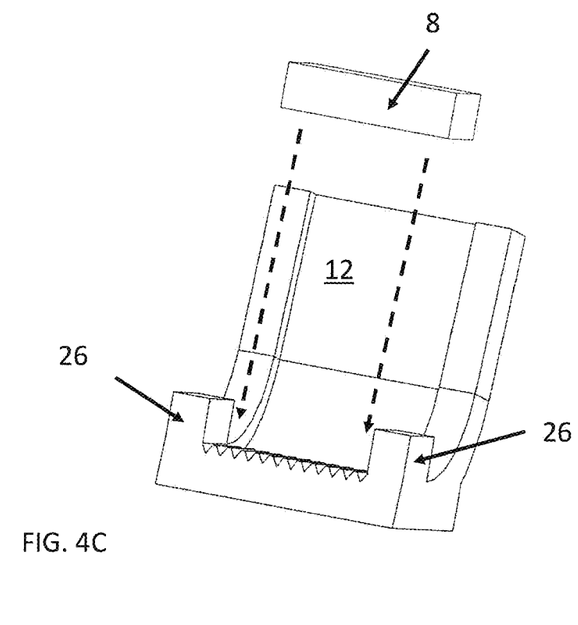
FIG. 4C is an exploded view of a base of the FIG. 4AB accepting a lid.

FIG. 4A depicts an assembled view of fiber array assembly 10 according to a first embodiment of the present invention. Optical fiber bundle 28 is covered with a fillable material 4, such as a UV curable epoxy. An acrylate polymer or polyimide that is cured using ultra-violet light made be used. Alternatively, a silicon that cures at room temperature can be used to impart some flexibility during assembly without introducing optical fiber bundle movement during assembly and use. FIG. 4B depicts lid 8 without grooves is fitted over optical fibers laid within lower grooves (24a-24n). Lid 8 protects optical bundle and each individual optical fiber 28d that is secured within the grooves by fixing material. FIG. 4C depicts lid 8 secured between opposing lid supports 26 by friction fit, but the lid 8 is not relied upon to ensure the optical fiber bundle does not move during use or assembly, the fixing material is relied on.

Figure 5:
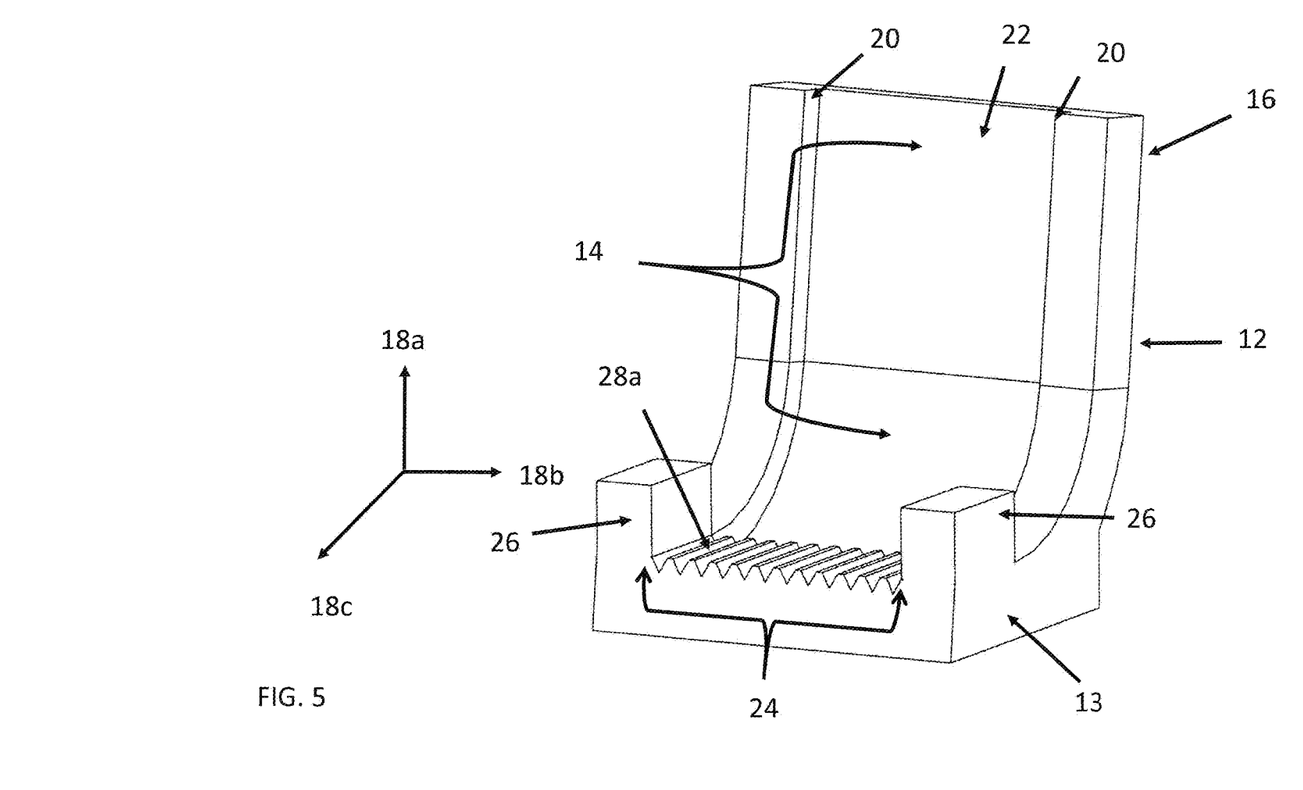
FIG. 5 is a perspective view of base 13 of fiber array device of FIG. 4A.

FIG. 5 depicts a second view of main body 12 comprising base 13 with opposing lid supports. A plurality of grooves are position within base 13 along direction 18b. As described above the grooves 24 are sized to accept optical fibers between 600 nm to 900 nm, so there is extra space wherein an individual fiber 28a can move in direction 18a or direction 18b. Main body 12 is formed as a single piece of material. Main body 12 has curved section 14 for receiving and bending the optical fiber extending in a first direction 18a to a second direction 18c, where the first direction 18a is different from the second direction 18c. The change in direction forms an angle of about 60 degrees to 120 degrees between a normal formed by the intersection of first direction 18a and second direction 18c. The main body angle is nearer to 90 degrees in many applications. Main body is a one-piece molded construction in which the grooves, which maybe concave or rounded, are formed. The main body maybe made of galls, plastic, epoxy or metal. The lid 8 maybe made of a transparent material to UV light, or solid material is room temperature curable, fixing material is used. The lid 8 is separate from the main body and is configured to releasably attach to the main body 12 between supports 26 for enclosing at least a portion of optical fibers. A recess 22 is formed by opposing shoulders 20 as part of back portion 16 of main body 12. The recess portion 14 as formed within main body by back portion 16 and shoulders 20 retains fixing material for the holding the optical fiber bundle to main body. Main body 12 ends with a base 13 parallel to third direction 18c to secure the fiber array assembly 10 to a printed circuit board. The fixing material has the benefit of reducing individual components thus allowing for a smaller footprint or overall sized fiber array device. The fixing material flowable prior to curing or setting, and can flow into spaces remaining with grooves, as the grooves may be larger when a 600 nm optical fiber is deployed in the optical fiber bundle.

Figures 6A, 6B:
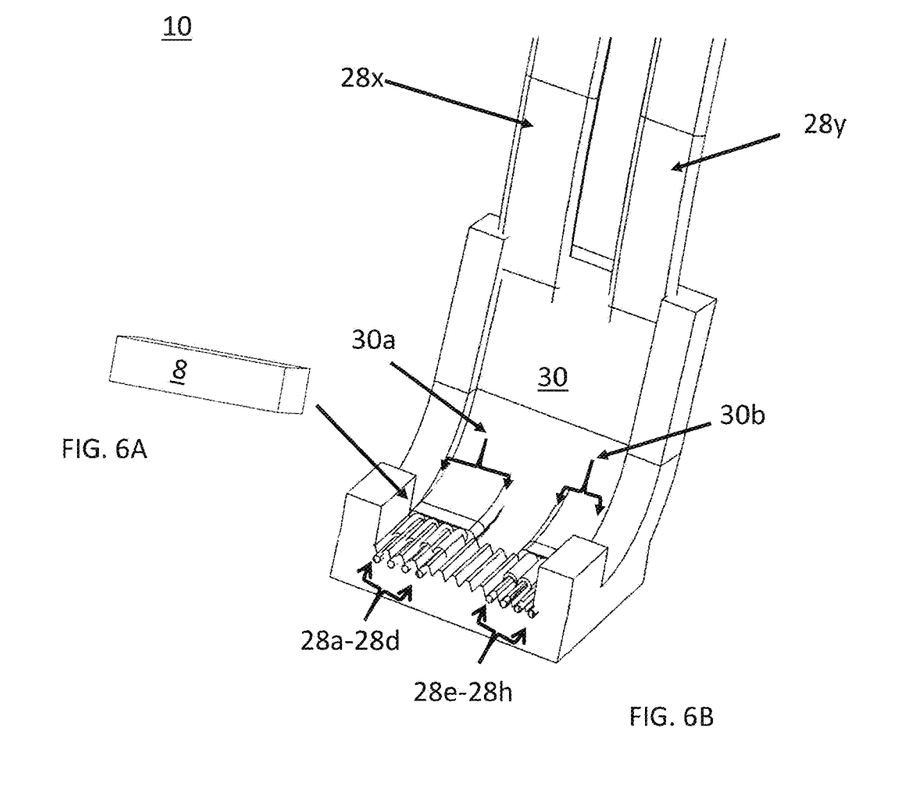
FIG. 6A depicts a lid without grooves.
FIG. 6B is a perspective view of FIG. 5 after fill material is cured with grooves formed as part of the base.

FIG. 6B depicts fixing material 30 covering a portion of optical fiber bundle 28 and individual fibers 28a-28i. Fixing material 30 allows the assembler to establish two separate channels (30a, 30b) for the optical fibers (28a-28d, 28e-28h) thereby increasing the number of bundles (28x, 28y) deployed over the prior art fiber arrays, in the present invention. Increasing optical fiber capacity over the prior art is a long-felt need when connector optical fibers to cooper based electronics on printed circuit board. FIG. 6B depicts no lid 8 embodiment depending on the type of fixing material used. FIG. 6A depicts securing lid 8 between lid supports 26 as assembled in FIG. 4A.

Figures 7A, 7B, 7C:
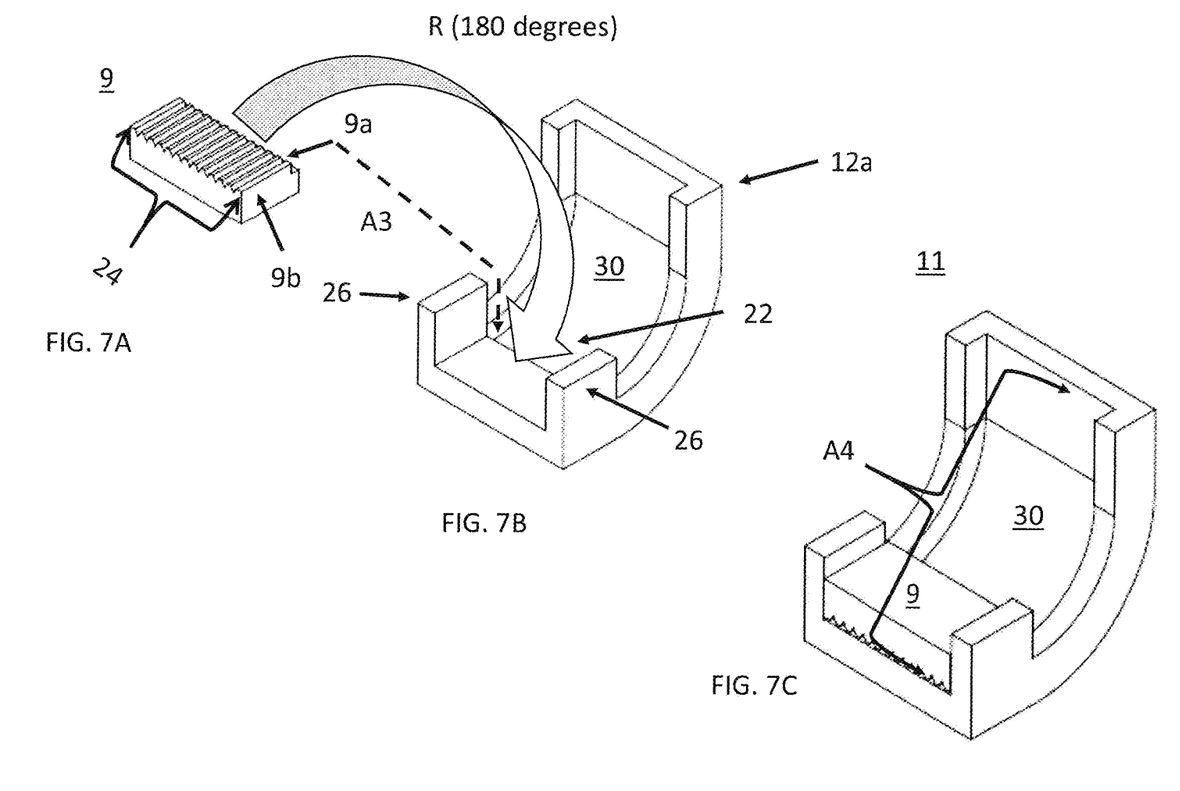
FIG. 7A is a perspective view of lid with grooves.
FIG. 7B is a perspective view of base configured to accept lid of FIG. 7A.
FIG. 7C is an assembled view of FIG. 7A and FIG. 7B.

FIG. 7A to FIG. 7C depicts a third embodiment of lid 9 with grooves 24 along the 18c direction formed on one side of the lid base 9b, with cut-out 9a along a second side. FIG. 7B depicts main body 12a, as describe above configured to accept fixing material 20, the main body 12a of FIG. 7B is configured to receive lid 9 rotated 180 degrees, as shown in arrow R, into opening formed between lid supports 26. The base is a smooth surface along the third direction 18c. As described in FIG. 6, fixing material 30 is deposited into recess 22. Cut-out 9a is mated with base portion 13 of main body 12 as shown along dotted line A3. FIG. 7C depicts lid 9 secured with main body 12 and fixing material 30 deposited generally at base with fixing material 11. Fixing material 30 can be deposited about the optical fiber bundles as shown by arrow A4, then lid 9 can be secured between supports with individual fibers secured within grooves as shown in FIG. 6, but with grooves or slots 24 formed as part of lid 9.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to being limiting. Other embodiments may be used, and other changes may be made, without departing from the spirit or scope of the subject matter presented herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera).

The invention claimed is:

1. A fiber array device for use in producing a bend in a plurality of optical fibers, the fiber array device comprising a main body formed of a single piece of material, the main body including a back portion having a curved section for receiving and bending the plurality of optical fibers from extending in a first direction to extending in a second direction different from the first direction and forming an angle with respect to the first direction, the back portion defining a recess configured to receive the optical fibers and to receive and retain a fixing material for holding the optical fibers and main body together, the main body further comprising a base portion having a plurality of grooves integrally formed therein, the grooves being sized and shaped for receiving individual ones of the plurality of optical fibers;

wherein the back portion comprises opposing shoulders defining the recess, the opposing shoulders being raised relative to an entirety of the back portion between the opposing shoulders such that the back portion is configured to receive the plurality of optical fibers in the recess at a recessed position in relation to the opposing shoulders.

2. The fiber array device as set forth in claim 1 further comprising a lid formed separately from the main body and configured to attach to the main body for enclosing at least a portion of the plurality of optical fibers between the lid and the main body.

3. The fiber array device as set forth in claim 2 wherein the lid is transparent.

4. The fiber array device as set forth in claim 1 wherein the main body is a one-piece molded construction in which the grooves are formed by molding.

5. The fiber array device as set forth in claim 4 wherein the main body is made of one of: glass, plastic, epoxy and metal.

6. The fiber array device as set forth in claim 1 wherein the curved section is configured to bend the plurality of optical fibers so that the angle between the first direction and the second direction is between about 60° and about 120°.

7. The fiber array device as set forth in claim 6 wherein the curved section is configured to bend the plurality of optical fibers so that the angle between the first direction and the second direction is about 90°.

8. The fiber array device as set forth in claim 1, wherein the curved section comprises a concave curved surface between the opposing shoulders, the main body configured to receive the plurality of optical fibers against the concave curved surface.

9. A fiber array device for use in producing a bend in a plurality of optical fibers, the fiber array device comprising a main body including a back portion having a curved section for receiving and bending the plurality of optical fibers from extending in a first direction to extending in a second direction different from the first direction and forming an angle with respect to the first direction, the back portion defining a recess configured to receive the optical fibers and to receive and retain a fixing material for holding the optical fibers and main body together, and a lid configured to be attached to the main body for enclosing at least a portion of the plurality of optical fibers between the lid and the main body, the lid having a plurality of grooves integrally formed therein, the grooves being sized and shaped for receiving individual ones of the plurality of optical fibers;

wherein the back portion comprises opposing shoulders defining the recess, the opposing shoulders being raised relative to an entirety of the back portion between the opposing shoulders such that the back portion is configured to receive the plurality of optical fibers in the recess at a recessed position in relation to the opposing shoulders.

10. The optical fiber array device as set forth in claim 9 wherein the main body further comprises a base portion, the lid being configured to be attached over the base portion of the main body.

11. The optical fiber array device as set forth in claim 10 wherein the base portion defines a smooth surface on which the plurality of optical fibers are received.

12. The fiber array device as set forth in claim 9 wherein the main body is a one-piece molded construction.

13. The fiber array device as set forth in claim 9 wherein the main body and lid are both made of one of: glass, plastic, epoxy and metal.

14. The fiber array device as set forth in claim 9 wherein the curved section is configured to bend the plurality of optical fibers so that the angle between the first direction and the second direction is between about 60 and about 120°.

15. The fiber array device as set forth in claim 14 wherein the curved section is configured to bend the plurality of optical fibers so that the angle between the first direction and the second direction is about 90°.

16. The fiber array device as set forth in claim 9, wherein the curved section comprises a concave curved surface between the opposing shoulders, the main body configured to receive the plurality of optical fibers against the concave curved surface.

17. A fiber array device for use in producing a bend in a plurality of optical fibers, the fiber array device comprising a main body including a back portion having a curved section for receiving and bending the plurality of optical fibers from extending in a first direction to extending in a second direction different from the first direction and forming an angle with respect to the first direction, the back portion defining a recess configured to receive the optical fibers and to receive and retain a fixing material for holding the optical fibers and main body together, the main body further including a base portion for receiving the plurality of optical fibers extending in the second direction, and a lid configured to be attached to the main body for enclosing at least a portion of the plurality of optical fibers between the lid and the main body, at least one of the lid at the base portion of the main body having a plurality of grooves integrally formed therein, the grooves being sized and shaped for receiving individual ones of the plurality of optical fibers;

wherein the back portion comprises opposing shoulders defining the recess, the opposing shoulders being raised relative to an entirety of the back portion between the opposing shoulders such that the back portion is configured to receive the plurality of optical fibers in the recess at a recessed position in relation to the opposing shoulders.

18. The optical fiber array device as set forth in claim 17 wherein the lid is transparent.

19. The fiber array device as set forth in claim 17 wherein the main body is a one-piece molded construction.

20. The fiber array device as set forth in claim 19 wherein the main body and lid are both made of one of: glass, plastic, epoxy and metal.

21. The fiber array device as set forth in claim 17 wherein the curved section is configured to bend the plurality of optical fibers so that the angle between the first direction and the second direction is between about 60° and about 120°.

22. The fiber array device as set forth in claim 21 wherein the curved section is configured to bend the plurality of optical fibers so that the angle between the first direction and the second direction is about 90°.

23. The fiber array device as set forth in claim 17, wherein the curved section comprises a concave curved surface between the opposing shoulders, the main body configured to receive the plurality of optical fibers against the concave curved surface.

* * * * *